US011792094B2

(12) United States Patent
Deb et al.

(10) Patent No.: US 11,792,094 B2
(45) Date of Patent: Oct. 17, 2023

(54) READ-WRITE NETWORK VISUALIZATION

(71) Applicant: o9 Solutions, Inc., Dallas, TX (US)

(72) Inventors: Mayuri Deb, Bangalore (IN); Narasimha Kamath, Bangalore (IN); S Pandiarajan, Bangalore (IN); Prashant Jhaba, Dehradun (IN); Rohit Jangid, Jaipur (IN); Koustuv Chatterjee, Gilbert (IN)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 17/991,490

(22) Filed: Nov. 21, 2022

(65) Prior Publication Data

US 2023/0164044 A1 May 25, 2023

Related U.S. Application Data

(60) Provisional application No. 63/264,558, filed on Nov. 24, 2021.

(51) Int. Cl.
*H04L 43/045* (2022.01)
*H04L 41/12* (2022.01)
*G06F 16/26* (2019.01)

(52) U.S. Cl.
CPC ............ *H04L 43/045* (2013.01); *G06F 16/26* (2019.01); *H04L 41/12* (2013.01)

(58) Field of Classification Search
CPC ........ H04L 43/045; H04L 41/12; G06F 16/26
See application file for complete search history.

(56) References Cited

U.S. PATENT DOCUMENTS

| | | | | |
|---|---|---|---|---|
| 2003/0065415 A1* | 4/2003 | Hegde | ................ | G06Q 10/0875 700/100 |
| 2014/0365647 A1* | 12/2014 | Haraszti | .................. | H04L 41/12 709/224 |
| 2021/0109972 A1* | 4/2021 | Boudin | .................. | G06T 11/206 |
| 2022/0327140 A1* | 10/2022 | Pham | ....................... | G06F 3/038 |

* cited by examiner

*Primary Examiner* — Andrey Belousov
(74) *Attorney, Agent, or Firm* — Schwegman Lundberg & Woessner, P.A.

(57) ABSTRACT

Systems and techniques for read-write network visualization are described herein. A selected sub-region of a visual representation of a graph network may be displayed based on inputs received from a user. Boundaries for the selected sub-region of the visual representation of the graph network may be calculated. State data may be captured for a portion of the graph network associated with the selected sub-region using the calculated boundaries for the selected sub-region of the visual representation upon activation of an edit mode user interface control. A change to an element of the graph network may be identified. The graph network may be modified based on the change. A formula may be identified that is associated with the element of the graph network. The formula may be automatically recompiled and values for the element of the graph network, and nodes and edges that share a path with the element, may be automatically recalculated using the recompiled formula.

24 Claims, 10 Drawing Sheets

READ-WRITE NETWORK VISUALIZATION

CLAIM OF PRIORITY

This patent application claims the benefit of U.S. Provisional Patent Application No. 63/264,558, filed Nov. 24, 2021, entitled "READ WRITE SUPPLY CHAIN NETWORK", which is incorporated by reference herein in its entirety.

TECHNICAL FIELD

Embodiments described herein generally relate to graph network visualization and, in some embodiments, more specifically to read-write network visualization.

BACKGROUND

Graph data networks are data networks that include node entities that may include attributes, values, and other data. The nodes are connected by edges that may define relationships between nodes and may be used to facilitate data flow and rules for data transformation as the data flows through the graph network. In an example, a global supply chain may use a graph network in which nodes represent physical locations or logical functions in a supply chain. The edges may define relationships between the physical and logical nodes. Graph networks may contain thousands or millions of nodes and edges and may include millions of data elements that may be incomprehensible as raw data. Furthermore, graph networks are not static but are dynamic and continually evolve. A user desires to understand the raw data and relationships between nodes by viewing a logical visual representation.

BRIEF DESCRIPTION OF THE DRAWINGS

In the drawings, which are not necessarily drawn to scale, like numerals may describe similar components in different views. Like numerals, having different letter suffixes may represent different instances of similar components. The drawings illustrate generally, by way of example, but not by way of limitation, various embodiments discussed in the present document.

DETAILED DESCRIPTION

Graph data networks (e.g., those underlying a supply chain network, etc.) are not static but continually evolve. For example, nodes and edges representing additional modes of transport and customer outlets may be added that cause the morphology of the graph network to transform. Graph network visualization using logical entities on a system allows changes to be immediately updated, which allows for plug and play operation. The changes made and the impact of the changes are generated, providing perceptible visibility to provide a user and stakeholders with accurate insight into the morphing data in the graph network. The user is enabled to alter the graph network in real-time and view the evolution of the graph network in real-time.

Supply chain ecosystems dynamically change. There is a need for rapid adaptation of supply chain visibility to accommodate the dynamic nature of supply chains. Transparent representation of the changes is provided by enabling a user to visually see the changes and their immediate impact on the supply chain plans. A read-write network is provided instead of a static network to enable dynamic representation of the network.

The supply chains of modern enterprises competing in global markets are complex and dynamic. Supply chain decisions made daily across businesses significantly impact the planet. Visibility of end-to-end (E2E) connected supply chains is a foundation and first step towards accelerating the speed and quality of decision-making processes. The complexity and dynamic nature of modern supply chains require computing systems to perform millions of calculations throughout a graph network structure that includes nodes that represent products, product components, production processes, transportation elements, etc. connected via edges that represent relationships and pathways between the nodes of the graph network. A graph network of a modern supply chain may include millions of nodes and edges and millions of calculations may be required to make predictions regarding activities within the supply chain to ensure that supply flow is adequate to meet demands within the network. The complexity of supply chain calculations has made it necessary to perform calculations via computing devices that can perform the high-volume calculations that could not be completed by humans within a time window necessary to make decisions and trigger actions within the supply chain to effectively meet the demands. Supply chain calculations (e.g., availability, supply flow, demand flow, transportation flow, etc.) may require millions of calculations and may result in raw data that may include complex data views that may not be interpretable in native form by a human. To enable interpretation of the supply chain data, the systems and techniques discussed herein transform the raw data into graphical views that enable a user to understand the states of the supply chain network.

Figure 1:
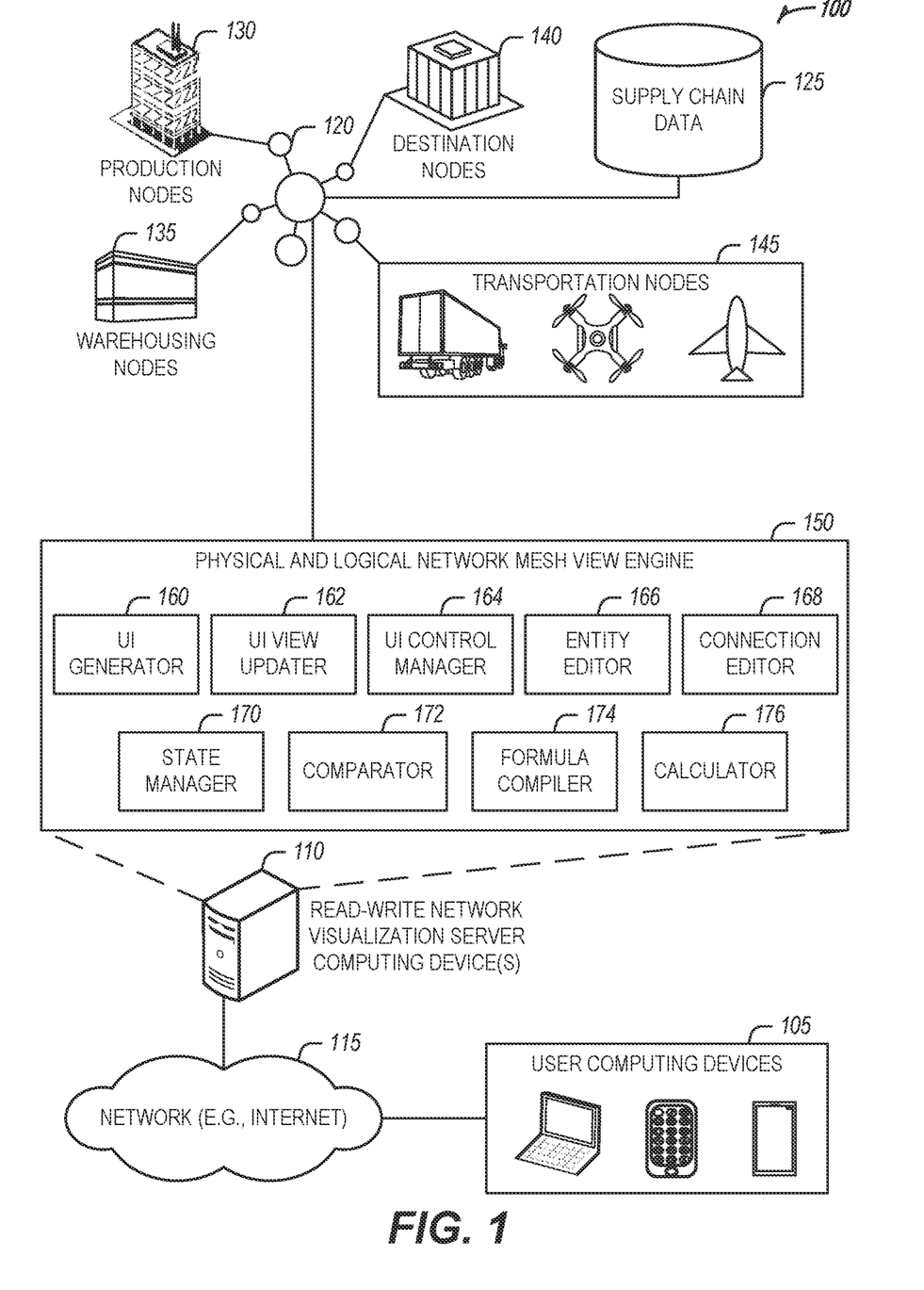
FIG. 1 is a block diagram of an example of an environment and a system for read-write network visualization, according to an embodiment.

FIG. 1 is a block diagram of an example of an environment 100 and a system 150 for read-write network visualization, according to an embodiment. The environment 100 may include user computing devices 105 (e.g., client computing devices, mobile computing devices, tablet computing devices, etc.) and read-write network visualization server computing device(s) 110 (e.g., a standalone server computing device, a cluster of computing devices, a cloud computing platform, etc.) that may be communicatively coupled via a network 115 (e.g., a wired network, wireless network, cellular network, satellite communication network, the internet, etc.). The read-write network visualization server computing device(s) 110 may include the system 150. In an example, the system 150 may be a read-write network visualization engine. The read-write network visualization engine may be a collection of processing circuitry and memory that includes instructions for generating visual representations of a graph network 120 and may receive and process inputs to formulate resultant outputs.

The system 150 may be communicatively coupled (or may obtain data from) the graph network 120 that may include a variety of nodes that represent, by way of example and not limitation, production nodes 130, warehousing nodes 135, destination nodes 140, and transportation nodes 145. The graph network 120 may be generated from, include, or may be updated using supply chain data 125. The graph network 120 is a data structure that defines nodes and edges of a supply chain and is used to calculate and track the movement of raw materials through production and delivery of products to end points (e.g., retailers, consumers, etc.). The read-write network visualization server computing device(s) 110 provides a visual representation of the underlying mesh network of a physical and logical graph network 120. The supply chain data 125 may represent a data aggregation based on collected information from a variety of internal (e.g., within a network of the graph network 120) and external data sources. The aggregated data may be input into the graph network 120 for generating and updating nodes and edges within the graph network 120 and for performing other data-centric actions within graph network 120.

The system 150 may include a variety of components including a user interface (UI) generator 160, a UI view updater 162, a UI control manager 164, an entity editor 166, a connection editor 168, a state manager 170, a comparator 172, a formula compiler 174, and a calculator 176. The components of the system 150 may be implemented in a single computing device or may be implemented singly or in various combinations across a variety of computing devices. The components may be implemented in hardware (e.g., field programmable gate arrays (FPGAs), application specific integrated circuits (ASICs), system on chip (SoC), etc.) or may be implemented as software circuits that may be stored as instructions in a machine-readable medium executed by at least one processor.

The graph network 120 is a data structure comprising a collection of nodes and edges to form a network of data entities. The physical data may be difficult to understand or may be meaningless to a human when presented in raw form. Thus, a logical visualization may be used to represent portions of the graph network 120 that may be understandable by a human user. The logical visualization represents a configuration of physical network elements in a graph network. For example, a logical visualization may include a set of logistical data-based flow pathways for raw materials between a manufacturer and raw material sources. The system 150 provides a visual representation of the logical architecture of the graph network 120 that is understandable and editable. The ability to edit the visual representation eliminates the complexity of finding and editing the underlying physical data.

A state of the graph network 120 is maintained for editing in a UI to provide the user a workspace to experiment with logical changes to the graph network 120. When the user commits the changes, the changes are integrated into the underlying graph network 120.

The UI generator 160 composes and displays user interfaces for the visual representation of the graph network. The user interfaces may include a design view user interface that includes a viewing region for viewing a subject portion of a logical visual representation of the graph network 120. The design view may include a variety of user interface controls such as, by way of example and not limitation, the UI controls described in FIGS. 2 to 8.

The UI view updater 162 receives signals as a result of user inputs or as a result of calculations made by the UI generator. The UI view updater 162 may work in conjunction with the UI generator 160 to regenerate or otherwise update data to be output for display in the UI. The user may provide inputs (e.g., via a user input device, etc.) that specify a portion of the logical visual representation of the graph network that is the subject portion to be edited in a viewing region of the design view. The UI view updater 162 may focus the viewing region of the user interface on the portion of the visual representation of a graph network based on the inputs received from a user.

The UI control manager 164 may manage data flow (e.g., inputs and outputs, etc.) of UT controls. For example, the user may activate an edit mode control to place the design view into an editing mode. In response to activation of the edit mode, the UT control manager may expose (or hide) controls that may be activated by the user to execute editing commands. The UI control manager 164 may work in conjunction with the UI generator 160 and the UI view updater 162 to generate and update views based on control activations, deactivations, and associated resultant commands.

The entity editor 166 tracks entities (e.g., nodes, etc.) that are contained in the viewing region. The entity editor 166 may manage available attributes, visual aspects of entities such as, by way of example and not limitation, shading, size, color etc. The entity editor 166 maintains a reference between a visual representation of a logical entity in the viewing region and a physical entity (e.g., data, a node, etc.) in the graph network 120.

The connection editor 168 tracks connections (e.g., edges, etc.) that are contained in the viewing region. The connection editor 168 may manage available attributes, visual aspects of connections such as, by way of example and not limitation, shading, size, color, etc. of a connection displayed in a UI. The connection editor 166 maintains a reference between a visual representation of a logical connection in the viewing region and a physical entity (e.g., data, a connection, etc.) in the graph network 120.

The entity editor 166 and the connection editor 168 may determine entities and connections to track based on bounds of the viewing region and the portion of the visual representation of the graph network 120 displayed therein. The entity editor 166 and the connection editor 168 may work in conjunction with the UI generator 160 and the UI updater 162 to calculate boundaries for the portion of the visual representation of the graph network using coordinates of at least two edges of the viewing region. In an example, the coordinates are points on a pixel map or points in an XY graph maintained by the UI generator 160.

The state manager 170 maintains state data for the subject portion of the graph network 120 which underlies the logical visual representation of the graph network 120. The state manager 170 captures state data for a portion of the graph network using the calculated boundaries for the portion of the visual representation upon activation of an edit mode user interface control. The UI view updater 162 identifies a change to an element of the graph network in conjunction with the comparator 172 by comparing a first set of visual element state data for the user interface identified at the activation of the edit user interface control to a second set of visual element state data for the user interface identified at the activation of a commit user interface control. In an example, element is a node or a connection represented by a visual element displayed in the viewing region.

The entity editor 166 and/or the connection editor 168 modifies the graph network based on the identified change. In an example, the change is an edit of a visual element displayed in the viewing region, an addition of a visual element in the viewing region, or deletion of a visual element from the viewing region. In an example, a replica may be created by the state manager 170 of the portion of the graph network. A verification test may be executed on the modified graph network by the state manager 170 and the state manager 170 may delete the replica of the portion of the graph network upon successful completion of the verification test. The entity editor 166 and/or the connection editor 168 identifies a formula associated with the element of the graph network and works in conjunction with the formula compiler 174 to automatically recompile the formula based on the change to the element of the graph network. The entity editor 166 and/or the connection editor 168 work in conjunction with the calculator 176 to automatically recalculate values for the graph network using the recompiled formula.

In an example, nodes and edges of the graph network may be identified within the portion of the graph network. Attributes and formulas are collected for the identified nodes and edges. Values are written into an array using formulas associated with the entity and the attributes and formulas are stored with visual representations of the nodes and edges.

In an example, the formula compiler 174 may determine node and edge variables in the formula. The node and edge variables may be updated based on the change. Attribute variables may be identified that are defined for the node and edge variables. The attribute variables may be updated based on the change and the formula may be written to a graph network executable using the updated node and edge variables, and the attribute variables.

In an example, the entity editor 166 and/or the connection editor 168 may automatically identify a new formula for the graph network based on the element and attributes for the element. The new formula may be populated using at least the element and the attributes and the new formula may be written to a graph network executable. The recompiled and/or new formulas may be stored in the graph network by the entity editor 166 and/or the connection editor 168 in a central repository or may be stored with an associated entity (e.g., node, etc.).

When the user activates a commit control maintained by the UI control manager 164, the UI control manager 164 causes the state manager 170 and entity editor 166 and/or the connection editor 168 to work in conjunction to safely integrate any changes to the logical visual representation of the graph network 120 in the graph network 120. If the user exits the editing session without committing the changes, the changes may be saved (e.g., in a work file, temp file, etc.) or may be discarded without integration of the changes made during the editing session into the graph network 120. This feature enables the user to experiment with logical reorganizations, additions, deletions, etc. without impacting the underlying graph network 120. The user may simulate the changes using the state data and formulas saved by the state manager 170 for the portion of the graph network.

Figure 2:
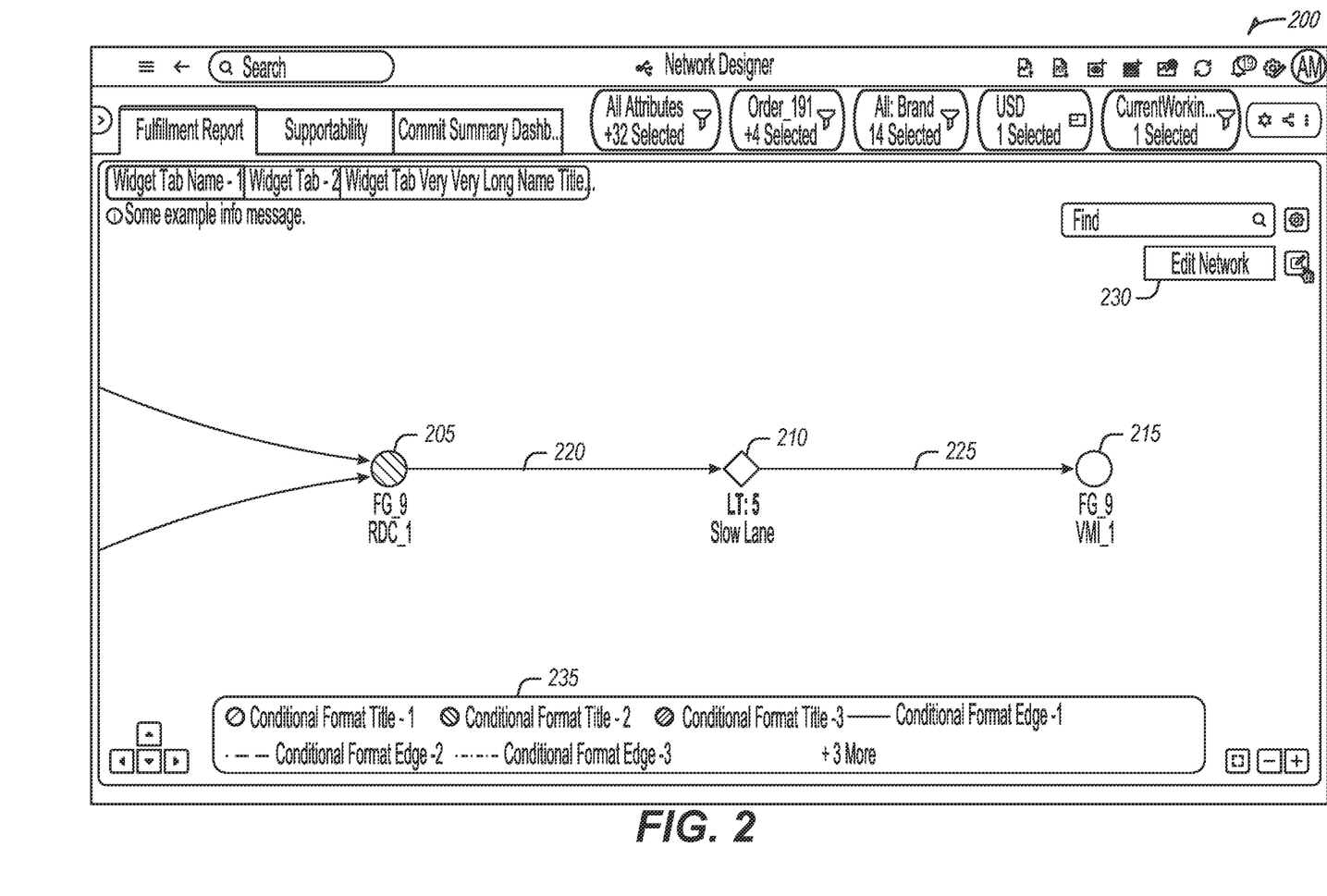
FIG. 2 illustrates an example of a network visibility interface using supply chain entities for read-write network visualization, according to an embodiment.

FIG. 2 illustrates an example of a network visibility interface 200 using supply chain entities, according to an embodiment. The network visibility interface 200 includes a first node 205, a second node 210, and a third node 215 of the graph network. A first edge 220 connects the first node 205 to the second node 210. A second edge 225 connects the second node 210 and the third node 215. A user may click on edit network. An edit network control 230 is provided that, when activated, places the network visibility interface 200 in a graph network editing mode.

The workflows of FIGS. 2 to 8 use four data structures: Nodes, Edges, Node Properties, and Edge Properties. The example data structures below illustrate a sample of some of the array data for elements shown in FIGS. 2 to 8.

Nodes and Edges Data Structures
Initial State of nodes represented in following array:

| | |
|---|---|
| Nodes= | |
| [RM1-Plant__1, | N1 |
| Int19-Plant__1, | N2 |
| Rm__2-Plant__1, | N3 |
| Int29-plant__1, | N4 |
| FG__9-Plant__1, | N5 |
| SubAssembly__FG__9-RM1__to__Int19__Plant__1, | N6 |
| SubAssembly__FG__9-RM2__to__Int29__Plant__1, | N7 |
| FinalAssembly__Int__Plant__1to__FG__Plant1 | N8 |
| ] | |

Initial state or edges represented in following array:

```
Edges= [
  N1->N6,
    N6->N2,
  N3->N7,
    N7->N4,
  N2->N8,
  N4->N8,
  N8->N5
]
```

Final State of nodes adding capacity alternate path:

| | |
|---|---|
| Nodes= | |
| [RM1-Plant__1, | N1 |
| Int19-Plant__1, | N2 |
| Rm__2-Plant__1, | N3 |
| Int29-plant__1, | N4 |
| FG__9-Plant__1, | N5 |
| SubAssembly__FG__9-RM1__to__Int19__Plant__1, | N6 |
| SubAssembly__FG__9-RM2__to__Int29__Plant__1, | N7 |
| FinalAssembly__Int__Plant__1to__FG__Plant1 | N8 |
| Alternate- FG__9-Mil1 | N9 |
| ] | |

Final state of array after adding capacity alternate path:

```
Edges=
[
N1->N6,
  N6->N2,
```

-continued

```
N3->N7,
N7->N4,
N2->N8,
N4->N8,
N8->N5,
N9->N8
]
```

Node Properties Data Structure

Each node is a multi-attribute entity. When a node is added, multiple attribute members are added for that node. Resource and location for the capacity node are added here.

For an attribute member, add member properties are added along with member name node properties:
Resource Name—Alternate FG_9, Mil_1
Resource Group—Assembly
Resource SubGroup—Sub Assembly Resource name is the member name and resource group and resource subgroup are its properties which points to its parent attribute members.

Edge Properties Data Structure

There are multiple edge properties related to an edge and an edge may be updated and values of those edge properties may be updated.

For edge N9->N8 the following values are populated. Capacity consumption Association, Capacity priority, Capacity qty per.

A key 235 is displayed that illustrates conditional changes to the graph network configured using the editing mode. Configuration changes (e.g., add, move, delete, etc.) to the graph network are visually displayed with formatting to inform the user which components have been modified. The formatting allows the user to model changes to the graph network without making changes to the underlying graph network. The user may activate a set of other user interface controls to trigger theoretical calculations based on the configuration changes made to the graph network. When the user has finished making configuration changes and is satisfied with the changes, the user may commit the changes which causes modification of the graph network and recalculation of data flows and formulas based on the reconfiguration of nodes and edges of the graph network.

Figure 3:
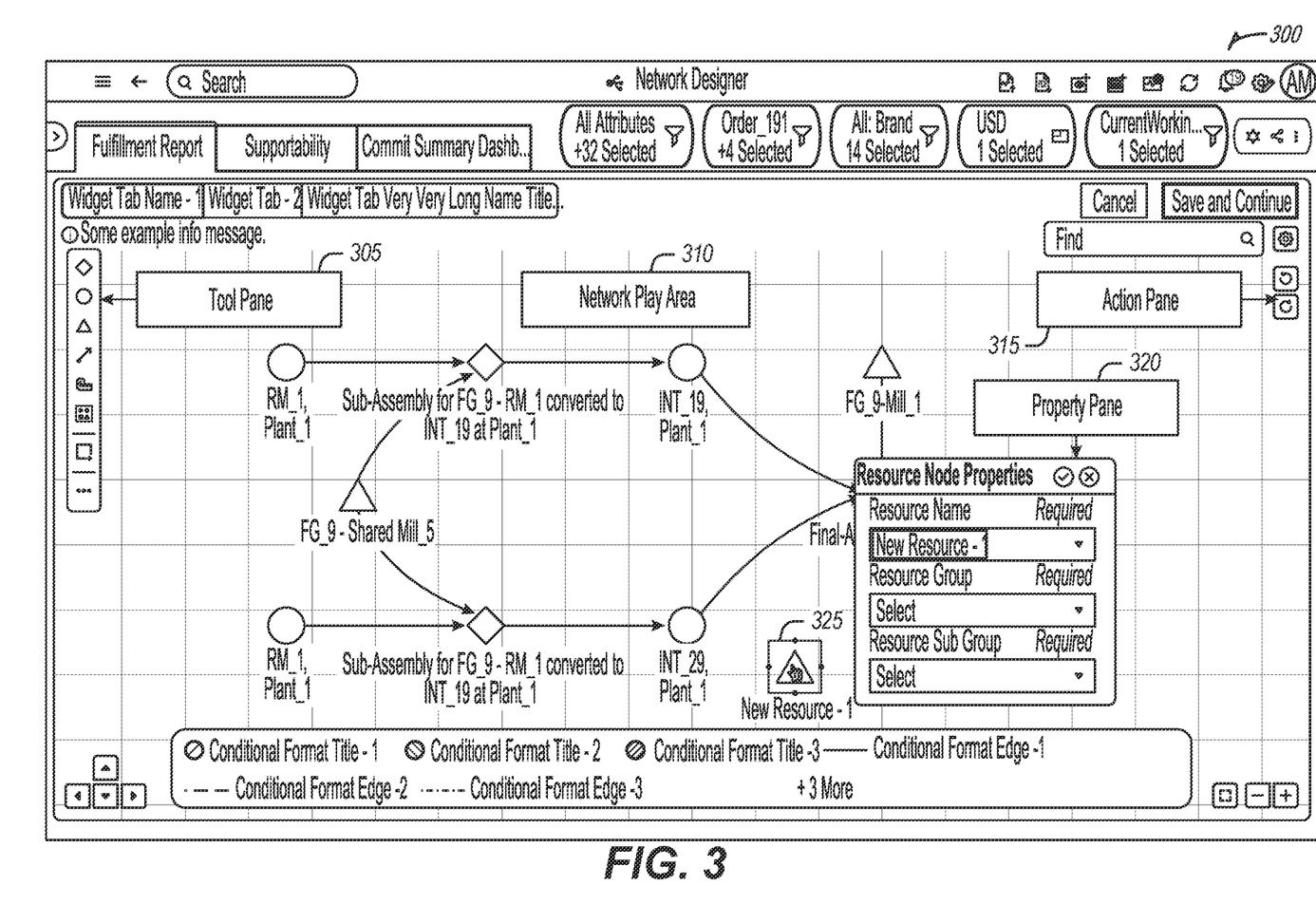
FIG. 3 illustrates an example of an edit network mode interface for read-write network visualization, according to an embodiment.

FIG. 3 illustrates an example of an edit network mode interface 300 for a read write network, according to an embodiment. The edit network mode interface 300 includes a tool pane 305 that includes a variety of editing user interface controls that are activated by the user to reconfigure or otherwise edit the graph network. A portion of the graph network is selected by the user in the network play area 310. An action pane 315 includes user interface controls for performing actions (e.g., undo, redo, etc.) in editing the graph network. The user selects a new entity control from the tool pane 305 to create a new node 325 in the graph network. Entities may include, by way of example and not limitation, material nodes, resource nodes, and operations. A property pane 320 is triggered and displayed that accepts attributes (e.g., resource name, resource group, resource subgroup, etc.) for the resource as shown in FIG. 4.

Figure 4:
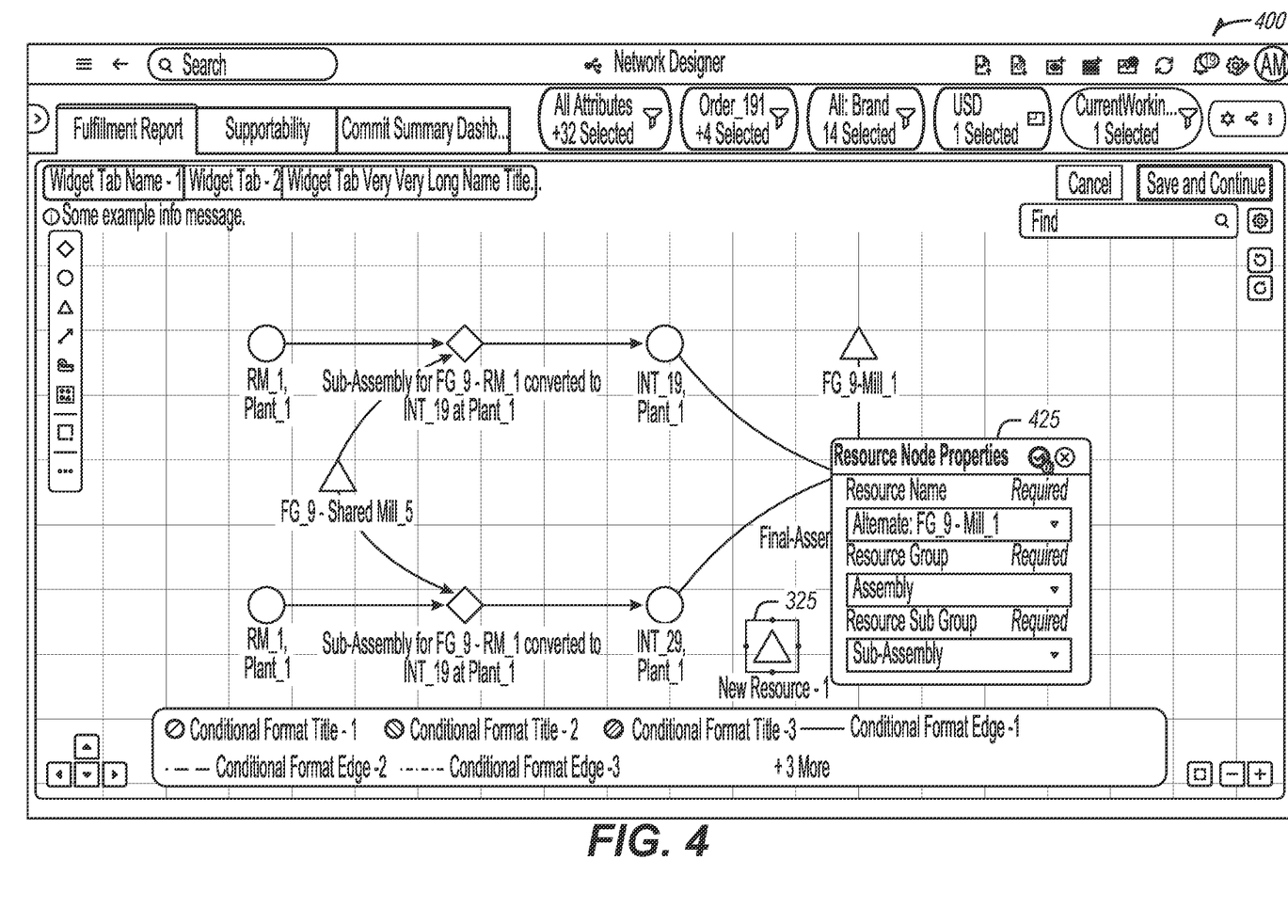
FIG. 4 illustrates an example of user interface controls for the addition of entities for read-write network visualization, according to an embodiment.

FIG. 4 illustrates an example of user interface controls 400 for the addition of entities, according to an embodiment. The user has made selections for the attributes and, when completed, commits the attributes for the new node 325. Committing the attributes stores the attributes with the new node 325 while the current editing session is active. If the user commits the changes to the graph network, a new node is generated in the graph network with the configured attributes.

Figure 5:
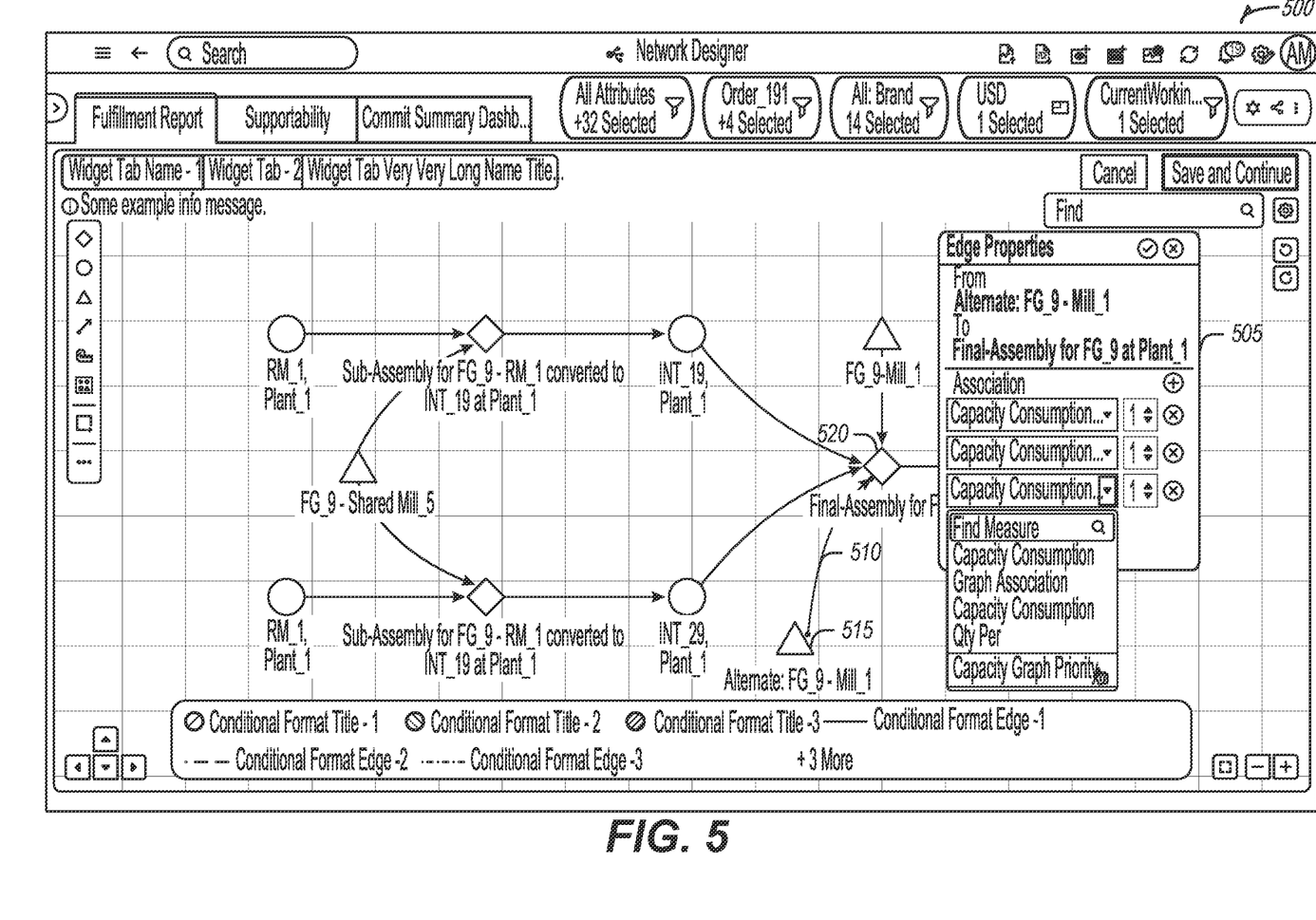
FIG. 5 illustrates an example of a user interface for drawing a connection with newly added entities for read-write network visualization, according to an embodiment.

FIG. 5 illustrates an example of a user interface 500 for drawing a connection with newly added entities, according to an embodiment. The user interface 500 includes a connection control that, when activated, allows a user to create a new edge 510 between a new entity 515 and another entity 520 of the graph network. When a new connection is created, an edge properties dialog box 505 is generated and displayed that receives attributes for the new edge 510. The user may save the new edge 510 and the attributes may be saved with the new edge while the editing session is active. When the user commits the configuration changes made during the editing session, the new edge is created in the graph network, new data flows are established, and formulas are created and updated based on the creation of the new edge in the graph network.

Figure 6:
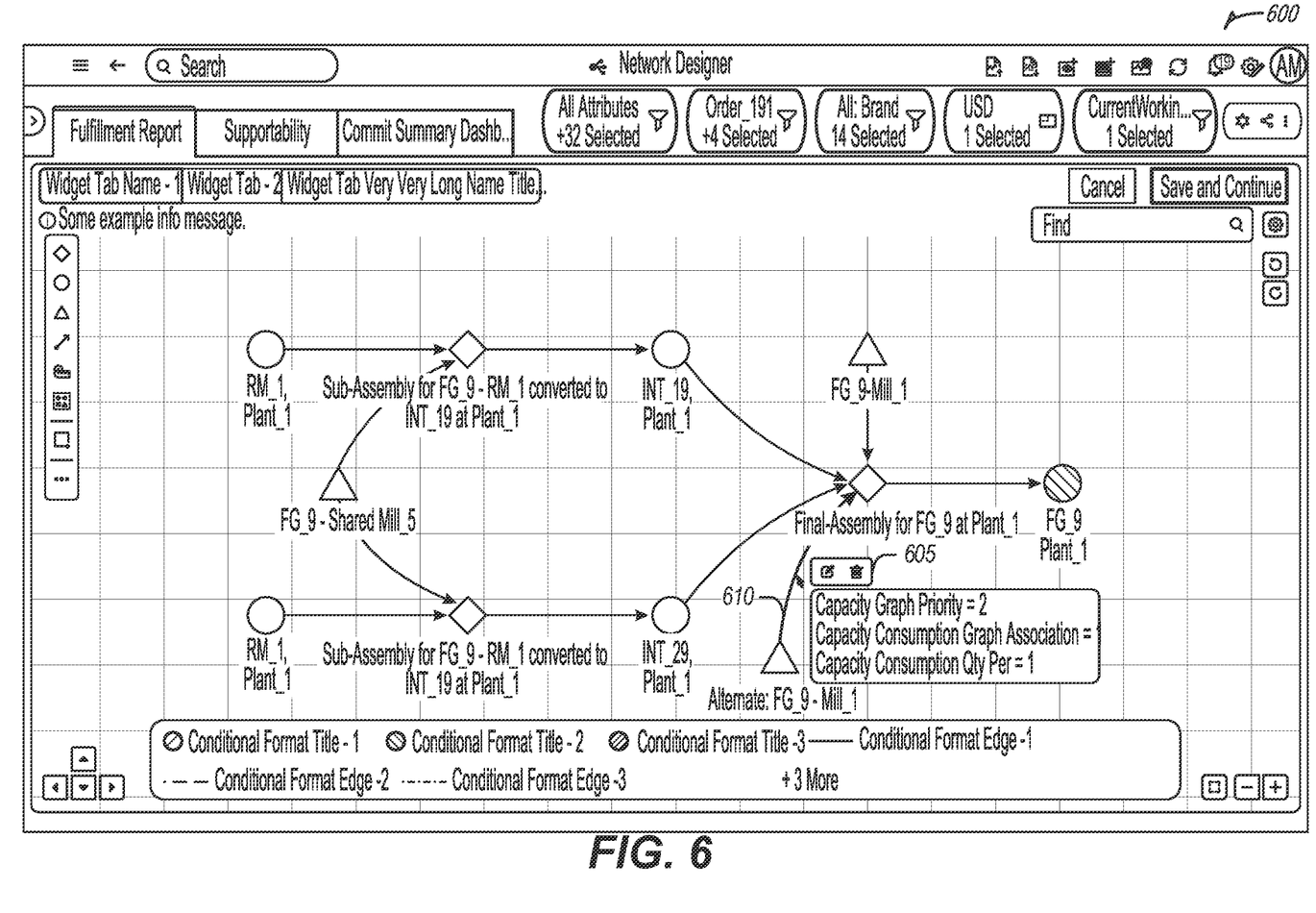
FIG. 6 illustrates an example of a user interface with controls for editing and deleting entities and connections for read-write network visualization, according to an embodiment.

FIG. 6 illustrates an example of a user interface 600 with controls 605 for editing and deleting entities and connections, according to an embodiment. The controls 605 may be activated by the user to edit properties of an edge 610 of the graph network. For example, the user may edit a capacity graph priority attribute, a capacity consumption graph association attribute, capacity consumption quantity per attribute, and other attributes of the edge 610. Any attribute changes are stored with the edge while the editing session is active. When the user commits changes that include the updated attributes, the attributes of the edge 610 will be updated in the graph network and formulas and values are automatically recalculated based on the updated attributes for the edge 610.

Figure 7:
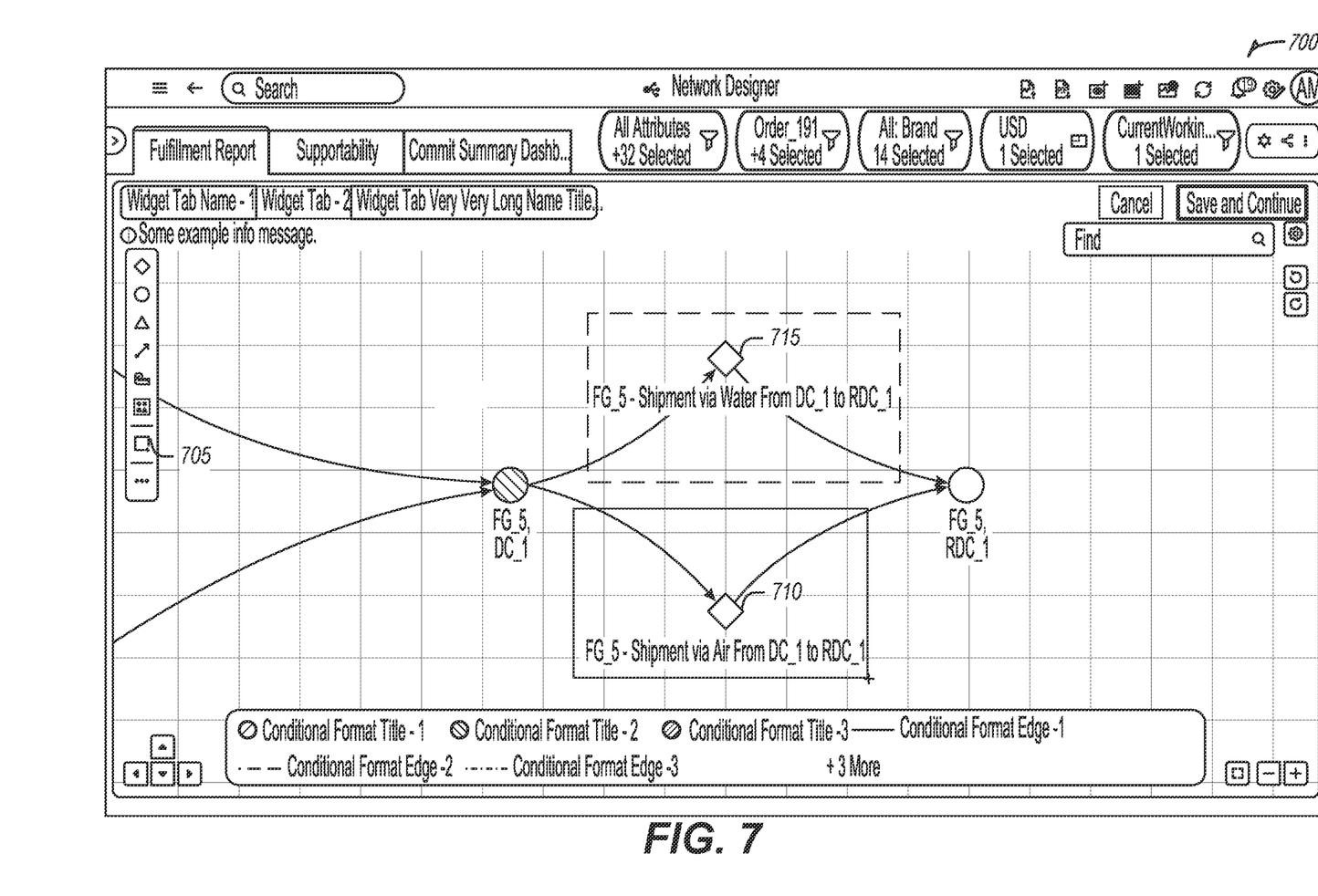
FIG. 7 illustrates an example of a user interface that includes a copy and paste control for altering the network for read-write network visualization, according to an embodiment.

FIG. 7 illustrates an example of a user interface 700 that includes a copy and paste control 705 for altering the network, according to an embodiment. The copy and paste control 705, when activated, allows the user to select a node, edge, etc. to be copied. For example, the user selects the node 710 using a selection box and the node 710 is copied including the attributes of the node. The user may paste the node 710 to another area of a network design view of the user interface 700. When the node 710 is pasted, a new node 715 is formed in the design view. The user may be prompted to enter a name and other attributes of the new node 715. The user may create connections between the new node 715 and other nodes present in the design view. In an example, the connections may be copied and connected to other nodes based on the connections established for the node 710. In an example, multiple nodes/edges may be copied/pasted in a single operation. For example, a selection control (e.g., lasso select, control-click, etc.) may be used to select multiple nodes to be copied. After copying the multiple nodes, the multiple nodes may be pasted into the graph.

When the user commits the changes to the design view, the graph network is updated to include the new node 715 and any connections established between the new node 715 and other nodes of the graph network. New formulas and values may be created based on the addition of the new node 715 and edges to the graph network and existing formulas and values may be automatically recalculated based on the presence of the new node 715 and connections in the graph network.

Figure 8:
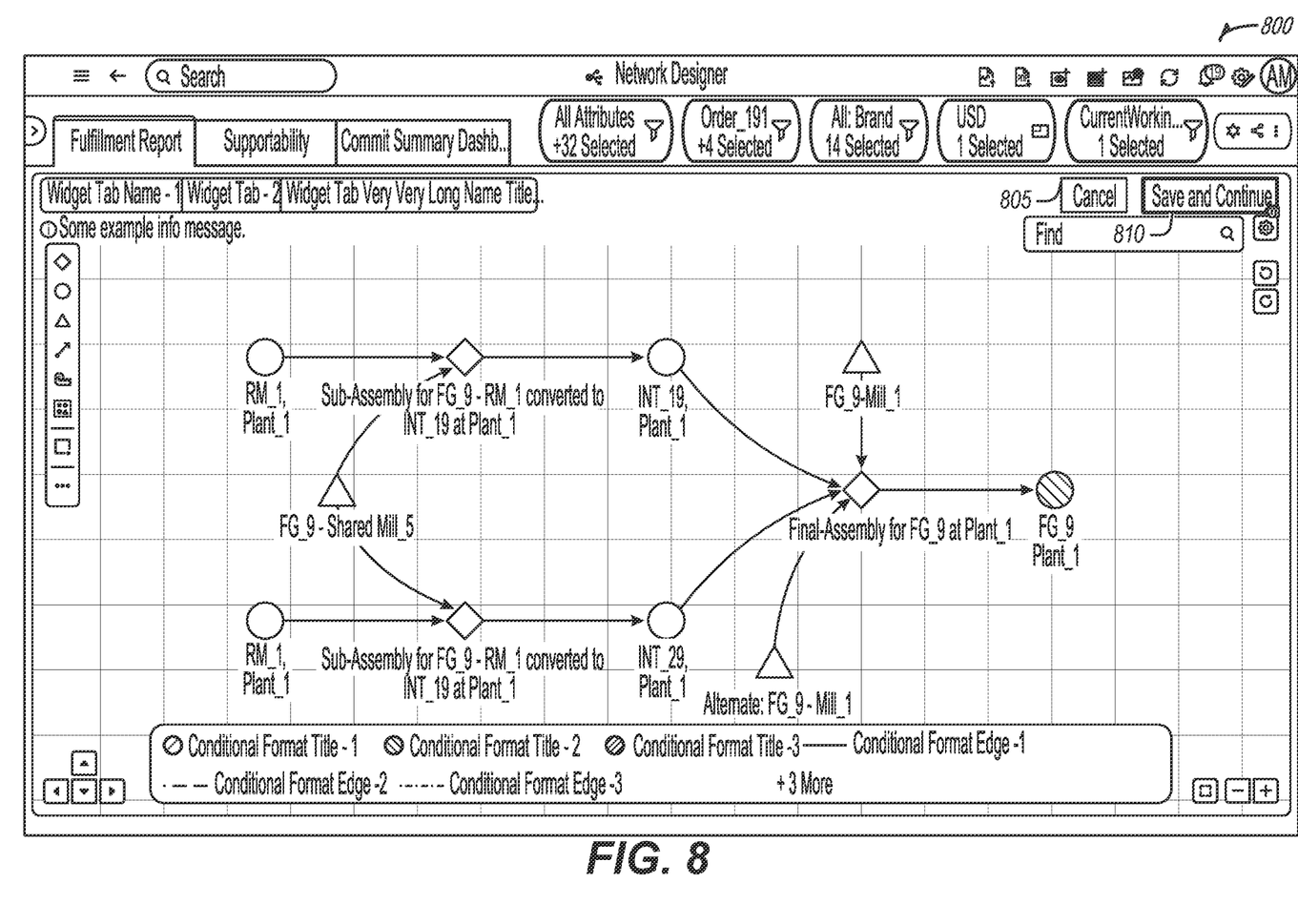
FIG. 8 illustrates an example of a user interface that includes controls for exiting or committing changes made during an edit mode to return to a static mode for read-write network visualization, according to an embodiment.

FIG. 8 illustrates an example of a user interface 800 that includes controls for exiting or committing changes made during an edit mode to return to a static mode for read-write network visualization, according to an embodiment. The user interface 800 includes a cancel control 805 that, when activated by a user, discards changes made to an edit mode of a design view of the user interface and returns the design view to a non-editable state. Thus, the user may model changes to the graph network without committing changes to the graph network. When the user enters edit mode, a state of a portion of the graph network that is viewable in the design view may be replicated and stored (e.g., in memory, to disk, etc.) so that the user may experiment with changes to the graph network to view the impact (e.g., changes to values, changes to formulas, changes to flows within the graph network, etc.) of a proposed change to the graph network. This enables the user to effectuate temporary changes to a copy of a real data version of the graph network without causing a change or disruption to the underlying production graph network.

For example, the user may add a node and may view a change to a flow (e.g., the flow of data through the nodes and edges of the graph network, etc.) in the graph network to see if the added change may cause a desired effect on the flow of the graph network.

The user interface 800 includes a save and continue control 810 that, when activated by the user, causes changes made during the edit mode of the design view to be committed (e.g., written to, etc.) the graph network. For example, the user may determine that the node addition has a desired effect on the flow of the graph network and the node and any connections established between the node and other nodes may be created in the graph network. The graph network will automatically update formulas and values or may automatically generate formulas and calculate values based on addition of the node. Committing the change using the save and continue control 810 may cause an immediate reconfiguration of the graph network or the change may be effectuated to the graph network during a maintenance window, etc.

Figure 9:
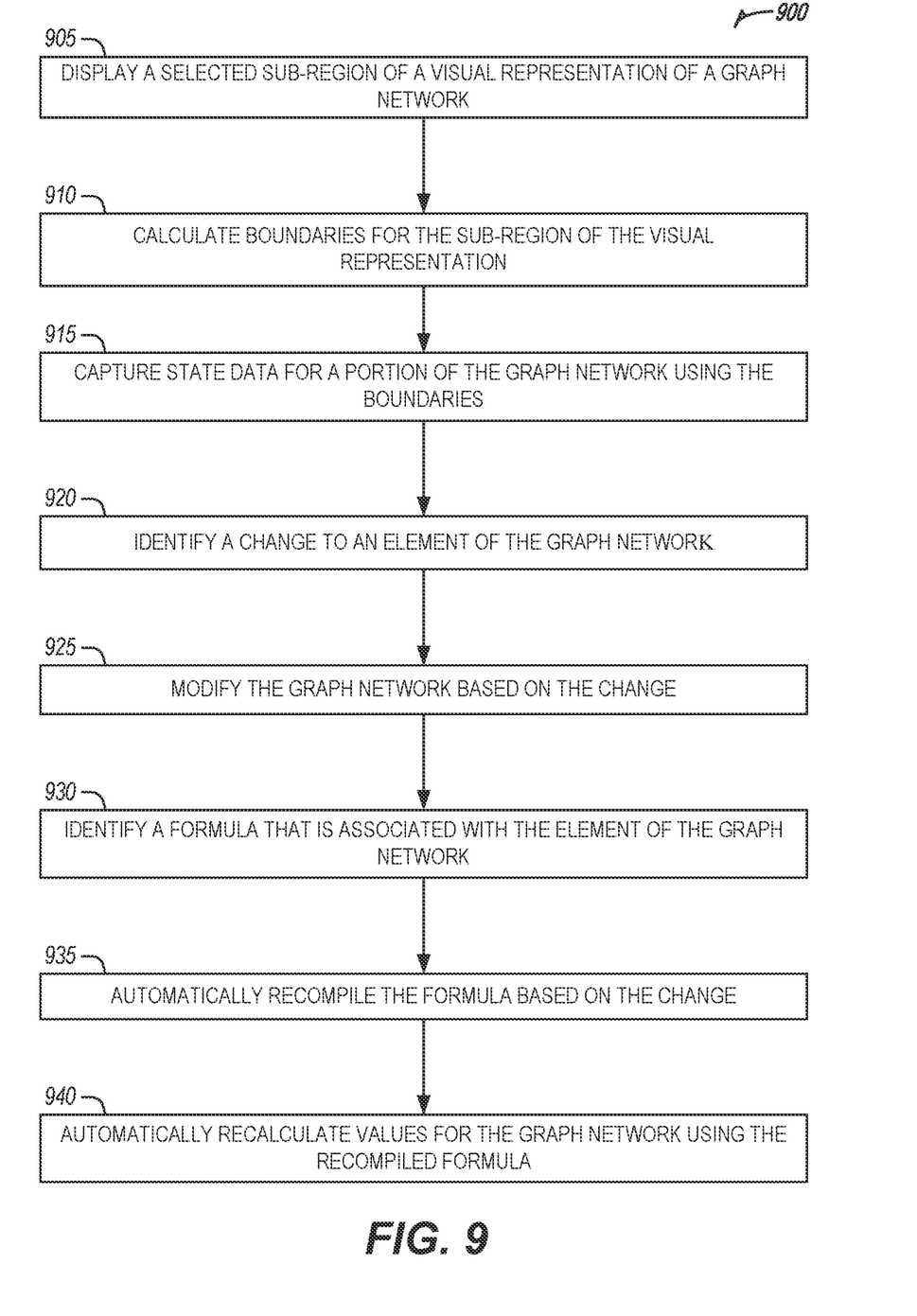
FIG. 9 is a flow diagram of an example of a method for read-write network visualization, according to an embodiment.

FIG. 9 is a flow diagram of an example of a method 900 for read-write network visualization, according to an embodiment.

A sub-region of a visual representation of a graph network may be displayed based on inputs received from a user (e.g., at operation 905).

Boundaries may be calculated for the sub-region of the visual representation of the graph network using coordinates of at least two edges of the sub-region (e.g., at operation 910). In an example, the coordinates are points on a pixel map or points in an XY plane.

State data may be captured for a portion of the graph network associated with the sub-region using the calculated boundaries for the sub-region of the visual representation upon activation of an edit mode user interface control (e.g., at operation 915). In an example, nodes and edges of the graph network may be identified that are within the portion of the graph network based upon activation of a selection user interface control. Attributes and formulas may be collected for the identified nodes and edges. For example, attributes and formulas may be collected that are associated with a node or an edge of the graph network. Values may be written into an array using the formulas and the attributes and formulas may be stored with the visual representations of the nodes and edges. For example, the formulas and attributes may be stored as properties of a visual representation of a node or an edge.

A change to an element of the graph network may be identified by comparing a first set of visual element state data for the user interface identified upon the activation of the edit mode user interface control to a second set of visual element state data for the user interface identified at activation of a commit user interface control (e.g., at operation 920). In an example, the element is a node or a connection represented by a visual element displayed in the sub-region. In an example, the change is an edit of a visual element displayed in the sub-region, an addition of a visual element in the sub-region, or deletion of a visual element from the sub-region.

The graph network may be modified based on the identified change (e.g., at operation 925). In an example, a replica of the portion of the graph network may be created upon the activation of the edit mode user interface control. A verification test may be executed on the modified graph network and, upon successful completion of the verification test, the replica of the portion of the graph network may be deleted. For example, a test script may be generated for the portion of the graph network and the output of the test script may be compared to predicted values for the test script to verify successful completion of the verification test.

A formula may be identified that is associated with the element of the graph network (e.g., at operation 930). The formula may be automatically recompiled based on the change to the element of the graph network (e.g., at operation 935). In an example, node and edge variables may be determined in the formula. The node and edge variables may be updated based on the change. Attribute variables may be identified that are defined for the node and edge variables. The attribute variables may be updated based on the change and the formula may be stored to a graph network executable using the updated node and edge variables, and the attribute variables. Values may be automatically recalculated for the graph, and nodes and edges sharing a path with the element of the graph network, using the recompiled formula (e.g., at operation 940).

In an example, a new formula for the graph network may be automatically identified based on the element and attributes for the element. The new formula may be populated using at least the element and the attributes and the new formula may be stored to a graph network executable.

Figure 10:
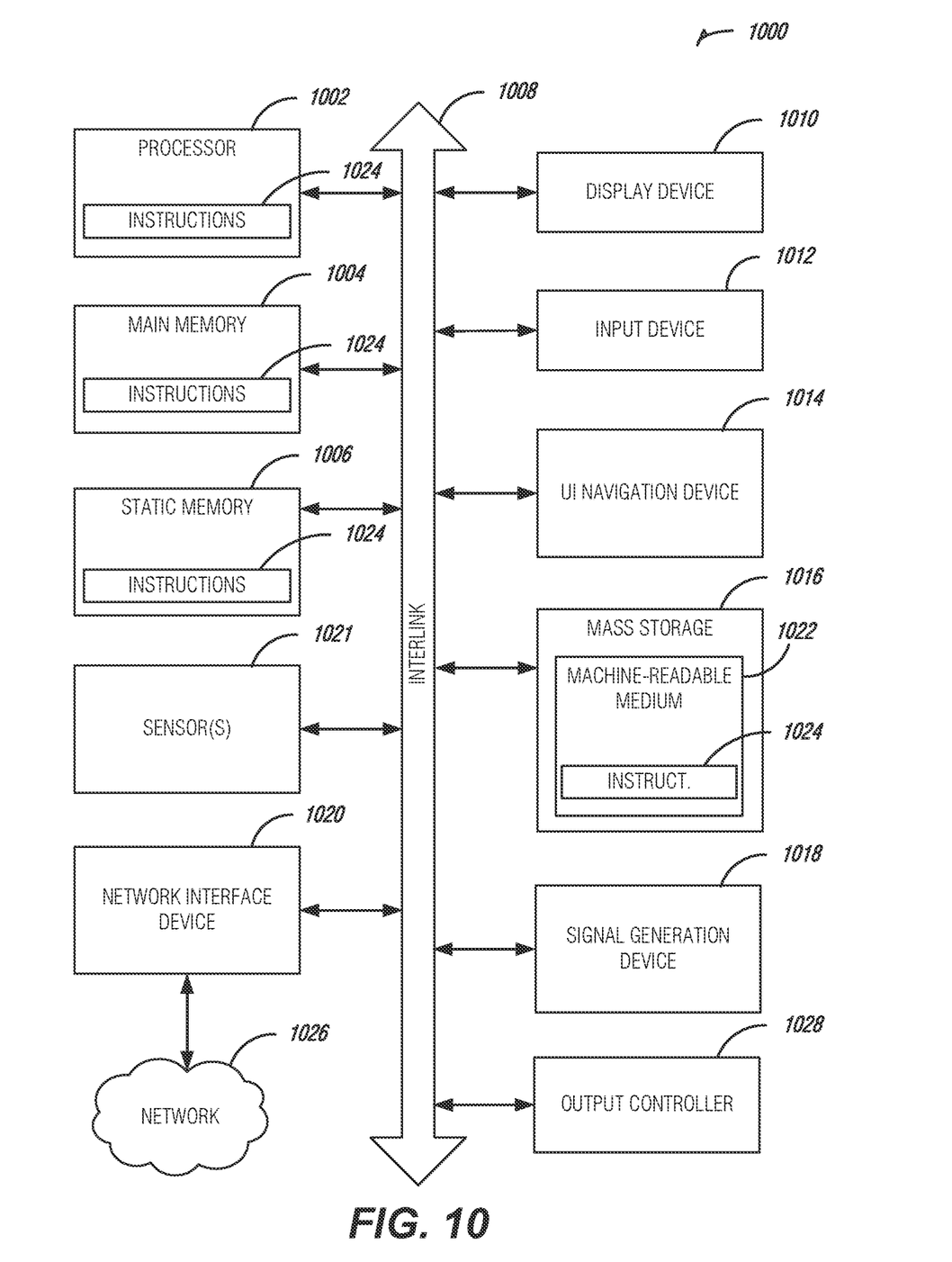
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may be performed. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and with underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensors. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that causes the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for state-based read-write graph network visualization comprising:
   at least one processor; and
   memory including instructions that, when executed by the at least one processor, cause the at least one processor to perform operations to:
      display a selected sub-region of a visual representation of a graph network based on inputs received from a user;
      calculate boundaries for the selected sub-region of the visual representation of the graph network using coordinates of at least two edges of the selected sub-region;
      capture state data for a portion of the graph network associated with the selected sub-region using the boundaries for the selected sub-region upon activation of an edit mode user interface control;
      identify a change to an element of the graph network by comparing a first set of visual element state data for the selected sub-region identified upon the activation of the edit mode user interface control to a second set of visual element state data for the selected sub-region identified at activation of a commit user interface control;
      modify the graph network based on the change to create a modified graph network;
      identify a formula associated with the element of the graph network;
      automatically recompile the formula based on the change to the element of the graph network to generate a recompiled formula; and
      automatically recalculate values for the element of graph network, and nodes and edges sharing a path with the element of the graph network, using the recompiled formula.

2. The system of claim 1, wherein the element is a node or a connection represented by a visual element displayed in the selected sub-region.

3. The system of claim 1, wherein the coordinates are points on a pixel map or points in an XY graph.

4. The system of claim 1, the instructions to capture the state data further comprising instructions that, when executed by the at least one processor, cause the at least one processor to perform operations to:
   identify nodes and edges of the graph network within the portion of the graph network based on activation of a selection control;
   collect attributes and formulas for the nodes and edges;
   write values into an array using the formulas; and
   store the attributes and formulas with visual representations of the nodes and edges.

5. The system of claim 1, wherein the change is an edit of a visual element displayed in the selected sub-region, an addition of a visual element in the selected sub-region, or deletion of a visual element from the selected sub-region.

6. The system of claim 1, the instructions to modify the graph network further comprising instructions that, when executed by the at least one processor, cause the at least one processor to perform operations to:
   create a replica of the portion of the graph network upon the activation of the edit mode user interface control;
   execute a verification test on the modified graph network; and
   upon successful completion of the verification test, delete the replica of the portion of the graph network.

7. The system of claim 1, the instructions to automatically recompile the formula further comprising instructions that, when executed by the at least one processor, cause the at least one processor to perform operations to:
   determine node and edge variables in the formula;
   update the node and edge variables based on the change to generate updated node and edge variables;
   identify attribute variables defined for the node and edge variables;
   update the attribute variables based on the change; and
   store the formula to a graph network executable using the updated node and edge variables, and the attribute variables.

8. The system of claim 1, the memory further comprising instructions that, when executed by the at least one processor, cause the at least one processor to perform operations to:
   automatically identify a new formula for the graph network based on the element and attributes for the element;
   populate the new formula using at least the element and the attributes; and
   store the new formula to a graph network executable.

9. At least one non-transitory machine-readable medium including instructions for state-based read-write graph network visualization that, when executed by at least one processor, cause the at least one processor to perform operations to:
 display a selected sub-region of a visual representation of a graph network based on inputs received from a user;
 calculate boundaries for the selected sub-region of the visual representation of the graph network using coordinates of at least two edges of the selected sub-region;
 capture state data for a portion of the graph network associated with the selected sub-region using the boundaries for the selected sub-region of the visual representation upon activation of an edit mode user interface control;
 identify a change to an element of the graph network by comparing a first set of visual element state data for the selected sub-region identified upon the activation of the edit mode user interface control to a second set of visual element state data for the selected sub-region identified at activation of a commit user interface control;
 modify the graph network based on the change to create a modified graph network;
 identify a formula associated with the element of the graph network;
 automatically recompile the formula based on the change to the element of the graph network to generate a recompiled formula; and
 automatically recalculate values for the graph network, and nodes and edges sharing a path with the element of the graph network, using the recompiled formula.

10. The at least one non-transitory machine-readable medium of claim 9, wherein the element is a node or a connection represented by a visual element displayed in the selected sub-region.

11. The at least one non-transitory machine-readable medium of claim 9, wherein the coordinates are points on a pixel map or points in an XY graph.

12. The at least one non-transitory machine-readable medium of claim 9, the instructions to capture the state data further comprising instructions that, when executed by the at least one processor, cause the at least one processor to perform operations to:
 identify nodes and edges of the graph network within the portion of the graph network based on activation of a selection control;
 collect attributes and formulas for the nodes and edges;
 write values into an array using the formulas; and
 store the attributes and formulas with visual representations of the nodes and edges.

13. The at least one non-transitory machine-readable medium of claim 9, wherein the change is an edit of a visual element displayed in the selected sub-region, an addition of a visual element in the selected sub-region, or deletion of a visual element from the selected sub-region.

14. The at least one non-transitory machine-readable medium of claim 9, the instructions to modify the graph network further comprising instructions that, when executed by the at least one processor, cause the at least one processor to perform operations to:
 create a replica of the portion of the graph network upon the activation of the edit mode user interface control;
 execute a verification test on the modified graph network; and
 upon successful completion of the verification test, delete the replica of the portion of the graph network.

15. The at least one non-transitory machine-readable medium of claim 9, the instructions to automatically recompile the formula further comprising instructions that, when executed by the at least one processor, cause the at least one processor to perform operations to:
 determine node and edge variables in the formula;
 update the node and edge variables based on the change to generate updated node and edge variables;
 identify attribute variables defined for the node and edge variables;
 update the attribute variables based on the change; and
 store the formula to a graph network executable using the updated node and edge variables, and the attribute variables.

16. The at least one non-transitory machine-readable medium of claim 9, further comprising instructions that, when executed by the at least one processor, cause the at least one processor to perform operations to:
 automatically identify a new formula for the graph network based on the element and attributes for the element;
 populate the new formula using at least the element and the attributes; and
 store the new formula to a graph network executable.

17. A method for state-based read-write graph network visualization comprising:
 displaying a selected sub-region of a visual representation of a graph network based on inputs received from a user;
 calculating boundaries for the selected sub-region of the visual representation of the graph network using coordinates of at least two edges of the selected sub-region;
 capturing state data for a portion of the graph network associated with the selected sub-region using the boundaries for the selected sub-region of the visual representation upon activation of an edit mode user interface control;
 identifying a change to an element of the graph network by comparing a first set of visual element state data for the selected sub-region identified upon the activation of the edit mode user interface control to a second set of visual element state data for the selected sub-region identified at activation of a commit user interface control;
 modifying the graph network based on the change to create a modified graph network;
 identifying a formula associated with the element of the graph network;
 automatically recompiling the formula based on the change to the element of the graph network to generate a recompiled formula; and
 automatically recalculating values for the graph network, and nodes and edges sharing a path with the element of the graph network, using the recompiled formula.

18. The method of claim 17, wherein the element is a node or a connection represented by a visual element displayed in the selected sub-region.

19. The method of claim 17, wherein the coordinates are points on a pixel map or points in an XY graph.

20. The method of claim 17, wherein capturing the state data further comprises:
 identifying nodes and edges of the graph network within the portion of the graph network based on activation of a selection control;
 collecting attributes and formulas for the nodes and edges;
 writing values into an array using the formulas; and storing the attributes and formulas with visual representations of the nodes and edges.

21. The method of claim 17, wherein the change is an edit of a visual element displayed in the selected sub-region, an addition of a visual element in the selected sub-region, or deletion of a visual element from the selected sub-region.

22. The method of claim 17, wherein modifying the graph network further comprises:
   creating a replica of the portion of the graph network upon the activation of the edit mode user interface control;
   executing a verification test on the modified graph network; and
   upon successful completion of the verification test, deleting the replica of the portion of the graph network.

23. The method of claim 17, wherein automatically recompiling the formula further comprises:
   determining node and edge variables in the formula;
   updating the node and edge variables based on the change to generate updated node and edge variables;
   identifying attribute variables defined for the node and edge variables;
   updating the attribute variables based on the change; and
   storing the formula to a graph network executable using the updated node and edge variables, and the attribute variables.

24. The method of claim 17, further comprising:
   automatically identifying a new formula for the graph network based on the element and attributes for the element;
   populating the new formula using at least the element and the attributes; and
   storing the new formula to a graph network executable.

* * * * *